United States Patent [19]

Mezzasalma

[11] 4,212,107
[45] Jul. 15, 1980

[54] LENS MEASURING METHOD AND APPARATUS

[76] Inventor: Orazio Mezzasalma, Edificio Parque Florida 45N Avenida Avila, La Florida, Caracas-105, Venezuela

[21] Appl. No.: 914,090

[22] Filed: Jun. 9, 1978

[51] Int. Cl.² ............................ G01B 5/08; G01B 5/20
[52] U.S. Cl. .............................. 33/174 A; 33/172 E; 33/169 B
[58] Field of Search ............. 33/174 A, 172 E, 172 R, 33/200, 178 D, 169 B; 356/124

[56] References Cited

U.S. PATENT DOCUMENTS

| | | | |
|---|---|---|---|
| 1,151,635 | 8/1915 | Webb | 33/172 R |
| 2,591,453 | 4/1952 | Maag | 33/147 |
| 2,600,498 | 6/1952 | Hamerly et al. | 33/178 |
| 2,916,828 | 12/1959 | Wait | 33/147 |
| 3,259,989 | 7/1966 | Wilson | 33/174 |
| 3,370,478 | 2/1968 | Martin | 74/395 |
| 3,479,744 | 11/1969 | Howland et al. | 33/172 R |
| 3,700,761 | 10/1972 | O'Driscoll | 264/1 |
| 3,776,620 | 12/1973 | Dianetti et al. | 351/13 |
| 3,778,135 | 12/1973 | Dianetti | 351/13 |
| 3,778,164 | 12/1973 | Walker | 356/124 |
| 3,791,720 | 2/1974 | Walker et al. | 351/13 |
| 3,839,304 | 10/1974 | Hovey | 260/80 |
| 3,842,253 | 10/1974 | Walker et al. | 240/41 R |
| 3,842,254 | 10/1974 | Dianetti | 240/41 R |
| 3,844,047 | 10/1974 | Carson | 33/172 E |
| 3,848,339 | 11/1974 | Strasbaugh | 33/174 A |
| 3,861,048 | 1/1975 | Thompson | 33/174 A |
| 3,903,609 | 9/1975 | Brown | 33/172 E |
| 3,908,279 | 9/1975 | Yoslow et al. | 33/174 L |
| 3,981,081 | 9/1976 | Welch | 33/174 A |
| 4,026,031 | 5/1977 | Siddall et al. | 33/174 L |

*Primary Examiner*—Willis Little
*Attorney, Agent, or Firm*—Lerner, David, Littenberg & Samuel

[57] ABSTRACT

Lens measuring method and apparatus for obtaining a desired measurement of a lens which is electrically conductive. The lens measuring apparatus comprises a first and second electrical conducting contacts adapted to contact a portion of the surface of the lens, the relative positioning of the first and second contacts being indicative of the desired measurement of the lens. Moving means are provided for moving the first electrical conducting contact relative to the second electrically conducting contact to vary the relative positioning of the first and second contacts. The apparatus also includes means for applying a potential across the first and second contacts to cause a current to be conducted between the first and second contacts through the lens when both the first and second contacts contact the surface of the lens, and sensing means are provided for sensing such current to indicate that both contacts are in contact with the lens. In the lens measuring method, the movement of the first contact is stopped when current between the two contacts is detected so that the precise relative position of the first and second contacts can be determined at the instant the first and second contacts contact the surface of the lens.

15 Claims, 5 Drawing Figures

LENS MEASURING METHOD AND APPARATUS

BACKGROUND OF THE INVENTION

The present invention relates to a method and apparatus for obtaining desired measurements of lenses, and more particularly for obtaining desired measurements of lenses which are made of electrically conductive lens material, or which otherwise can be adapted to conduct electricity. For example, the method and apparatus are particularly useful for obtaining desired measurements of soft-type or hydrophilic contact lenses which are normally made from a hydrogel material. As for the types of measurements which are desired, the method and apparatus are particularly useful for determining the radius of curvature of lenses from which the optical focal properties of the lens can be determined.

Lens measuring devices and apparatus are generally known which are capable of measuring the focal properties, e.g. the radius of curvature, of hard-type lenses. Some of such known devices are shown in U.S. Pat. No. 1,151,635, U.S. Pat. No. 3,848,339, and U.S. Pat. No. 3,861,048. Basically, for measuring the radius of curvature, these arrangements all operate upon the principle of making three point contact with the curved lens surface in which the three points of contact lie along a straight line. The radius of curvature can then be determined by determining the relative positioning or displacement of the center point of contact vis-a-vis the two other points of contact. In the prior art arrangements, the three points of contact usually comprise three posts arranged in a straight line (e.g. U.S. Pat. Nos. 1,151,635 and 3,848,339) or a cylindrical ring and a centrally disposed post (e.g. U.S. Pat. No. 3,861,048) with the central contact being displaceable (and spring biased) relative to the two outside contact points. The radius of curvature of hard-type lenses is then easily determined by firmly contacting the lens with the three contact points and determining the relative displacement of the central contact point. Since the lenses are normally hard and nondeformable, an accurate and repeatable measurement can be obtained by simply insuring that all three contact points are in firm contact with the lens.

However, this type of assurance of accurate and repeatable measurement is not possible with the soft-type contact lenses since such lenses are deformable and firm contact with the contact points will not necessarily give an accurate measurement. Furthermore, there is an added difficulty in that the lenses, being contact type lenses, are extremely small.

Prior art devices for measuring the radius of curvature or other optical properties of soft-type contact lenses have generally included variations of lens measuring apparatus adapted for measuring hard-type contact lenses but which rely on visual observation of contact as opposed to hard, firm contact. In such prior art devices, the lens rests on an outer support ring and the central contact post is moved manually until it contacts the surface of the lens, as confirmed visually. As can be appreciated, such an arrangement introduces a degree of subjectivity to measurements, even if magnifying glasses and microscopes are utilized to establish contact. Thus, it is most difficult to achieve an acceptable tolerance of error in measurement and in repeatability of measurement.

SUMMARY OF THE INVENTION

These and other disadvantages of the prior art are overcome with the present invention which utilizes the electrically conductive properties of certain lens to indicate when the contacts engage the surface of the lens.

The apparatus in accordance with the present invention comprises first and second electrical conducting contacts adapted to contact respective portions of the surface of the lens, the relative positioning of the first and second contacts being indicative of the desired measurement of the lens. Moving means are provided for moving the first electrical conducting contact relative to the second electrically conducting contact to vary the relative positioning of the first and second contacts. The apparatus also includes potential means for applying a potential across the first and second contacts to cause a current to be conducted between the first and second contacts through the lens when both the first and second contacts contact the surface of the lens, and sensing means for sensing such current to indicate that the contacts are in contact with the lens.

The method of the present invention is practiced by providing first and second electrically conducting contacts, the relative position of which is indicative of a desired measurement and applying a potential across such contacts so that when the two contacts contact the surface of the electrically conducting lens, a current is conducted between the first and second contacts through the lens. Upon sensing this current, the movement of the first contact relative to the second contact is stopped so that the relative position of the first and second contacts can be determined.

This use of the electrical conducting characteristic of certain types of lenses provides a means by which accurate and repeatable measurement of lenses can be obtained. This is extremely useful and overcomes the problem of subjectivity in lens measuring apparatus and methods of the prior art which rely on visual observation of contact between the contacts of the lens measuring apparatus and the lens.

These and further features and characteristics of the present invention will be apparent from the following detailed description in which reference is made to the enclosed drawings which illustrate preferred embodiments of the present invention.

DETAILED DESCRIPTION OF THE PRESENT INVENTION

Figure 1:
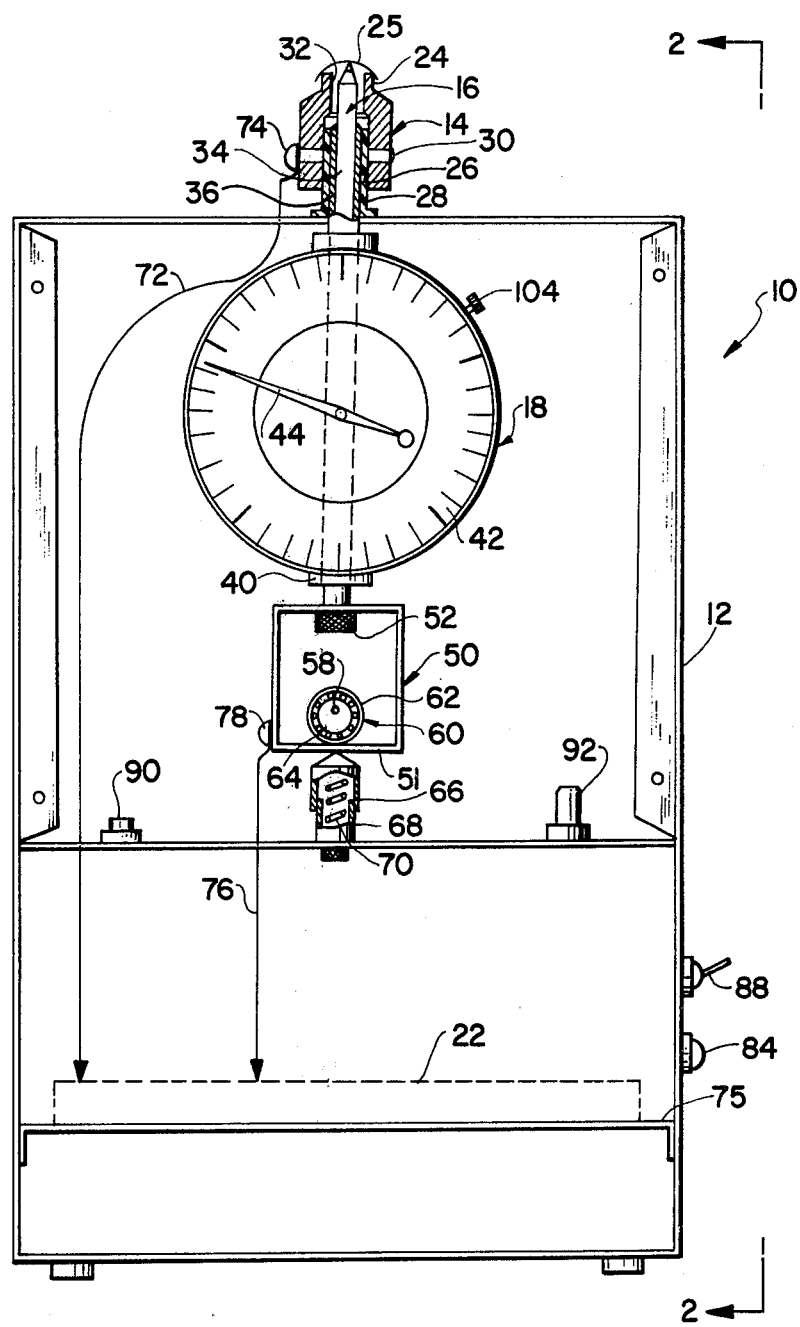
FIG. 1 is a front elevational view, partly in section, of the lens measuring apparatus according to the present invention.
Figure 2:
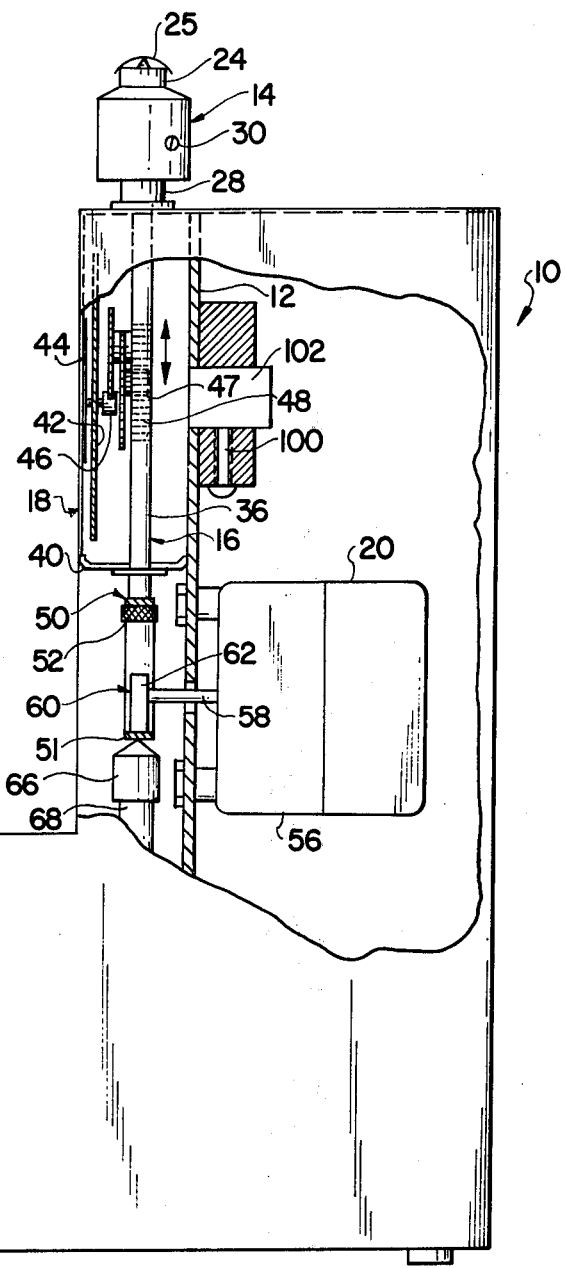
FIG. 2 is a side elevational view, partly in section, of the lens measuring apparatus, taken along lines 2—2 of FIG. 1.

With reference to the drawings in which like reference numerals designate like or corresponding parts, there is shown, in FIGS. 1 and 2, a lens measuring device 10 constructed in accordance with the present invention. The lens measuring device 10 includes generally a support frame or housing 12 for supporting the various components of the device 10, a lens support member 14, a calibration post or rod 16, a dial indicator or gauge 18, a motor 20 for moving the rod 16, and electrical circuitry 22 for controlling generally the operation of the lens measuring device 10.

The lens support member or collar 14 comprises a metallic body having an upwardly extending cylindrical column 24 on which the lens 25 to be measured is supported, either in a convex or a concave orientation. The support collar 14 has an inner bore 26 extending from its lower end by which the support collar 14 is mounted on a cylindrical hollow nylon bearing 28 fixedly supported on the frame 12 of the device 10. An adjusting holding screw 30 is provided for adjustably holding and supporting the lens support collar 14 on the hollow nylon bearing 28. The upper end of the lens support collar 14 has a second bore 32 concentrically arranged with respect to the bore 26.

The calibration post or rod 16 comprises a metallic rod 34 supported in a metallic cylindrical sleeve 36 which in turn is mounted for axial movement within the nylon bearing 28 and the upper cylindrical bore 32 of the lens support collar 14. The axis of the metallic rod 34 conincides with the axis of the bore 32 and cylindrical support column 24. At its upper end, the rod 34 is conical in shape in order to generally provide point contact with the surface of the lens 25 supported by the support column 24. The cylindrical sleeve 36 on the metallic rod 34 provides a relatively tight fit within the inner bore of the nylon bearing 28 so that the axis of the rod 34, and thus the tip of the conical section, will always be aligned with the axis of the bore 32 and support column 24.

The calibration rod 16 extends downwardly through an appropriate opening in the top of the housing 12 into and through the dial indicator or gauge 18. As best seen in FIGS. 1 and 2, the dial gauge 18 comprises a gauge housing 40, a dial scale 42, an indicator needle 44, and a series of gears 46, 47 in its interior cooperatively arranged to translate or convert the axial movement of the calibration rod 16 into rotational movement of the indicator needle 44. For this purpose, the calibration rod 16 includes a rack 48 along the surface of the sleeve 36 which drives a pinion 47, which in turn drives through gearing 46 the indicator needle 44, in a conventional manner.

The calibration rod 16 extends downwardly below the dial gauge 18 and is fixedly connected to a metallic rectangularly shaped frame 50 by means of nut 52. The drive means for causing relative movement between the calibration rod 16 and the support collar 14 comprises a D.C. motor 20 and reduction gear box 56 supported on the housing 12. The drive shaft 58, coupled to the reduction gear box 56, extends through the housing 12 and is attached to a drive wheel arrangement 60 mounted within the metallic rectangular shaped drive frame 50. The drive wheel arrangement 60 comprises two concentrically arranged wheels 62, 64, one of which is mounted within the other for relative rotation. The outer surface of the outer wheel 62 engages the lower metallic plate 51 of the rectangular shaped frame 50 and the inner wheel 64 is eccentrically connected to the drive shaft 58. Because of this eccentric drive arrangement, rotation of the inner wheel 64 by rotation of the drive shaft 58 will cause vertical movement of the metallic drive frame 50, and thus the calibration rod 16, relative to the axis of the drive shaft 58, and thus relative to the lens measuring apparatus housing 12. As best seen in FIG. 1, an outer hollow post 66 is slidably mounted on an inner hollow cylinder 68 fixed to the support frame 12. The outer post 66 is spring biased upwardly by means of coil spring 70 positioned within inner cylinder 68. This arrangement insures that the lower plate 51 of the metallic drive frame 50 will always be maintained in contact with the outer surface of the drive wheel 62, thereby insuring for a positive direct drive arrangement for moving of the calibration rod 16. The reduction gear box 56 serves to reduce the number of revolutions of the drive shaft 58 relative to the rotating speed of the D.C. motor 20 in order that the speed at which the calibration rod 16 is moved is maintained at a relatively slow speed.

As noted above, the radius of curvature of lenses is related to the relative axial positions of the three points of contact with the lens. In particular, for a given support column 24, in which the diameter of the contact (i.e., the outer diameter of the support column 24 for concave orientations of lenses 25 or the inner diameter for convex orientations) is known, the radius of curvature can be calculated on the basis of well-known geometric and trigonometric relationships by determining the elevation of the tip of the calibration post 16 relative to the elevation of the contact by the support column 24. For example, see the calculations made in U.S. Pat. No. 3,861,048. Thus, with a suitable arrangement of gearing 46, 47 and dial markings on the scale 42, the relative movement of the calibration rod 16 by the D.C. motor 20 relative to the support column 24 can be easily converted to indicate relative changes in radius of curvature and the radius of curvature of a lens 25 supported on the support collar 14 can be read directly from the dial gauge 18.

As their name implies, soft-type contact lenses are inherently flexible or pliable. Accordingly, radius of curvature measurements in the past have been difficult to make since it is not possible to rely on firm or hard contact of the measuring contacts with the lens as such firm contact would cause deformation of the lens. Rather, in the past, reliance had to be made on a visual observation of contact of the movable calibration post with the lens. This, however, introduced a degree of subjectivity into the measurement, and it was thus difficult to obtain accurate and repeatable measurements.

In addition to their flexibility, soft-type contact lenses also have a hydrophilic quality. That is, soft-type contact lenses have an affinity for water, and in fact water is an essential ingredient in the finished lens. Examples of soft-type or hydrophilic contact lenses are described in U.S. Pat. Nos. 3,408,429, 3,700,761, and 3,839,304. The soft or hydrophilic contact lenses are manufactured in a dry state; then before wearing, the lenses are treated and maintained in a wet or hydrated state with a normal saline solution. When so hydrated with this normal saline solution, the soft or hydrophilic contact lenses are electrically conducting—that is, electricity can be conducted therethrough. It is this feature of electrical conductivity of soft or hydrophilic lenses which may be used to achieve accurate and repeatable measurements of the radius of curvature, or other surface measurements indicative of optical properties, of the lenses in accordance with the principles of the present invention.

Figure 3:
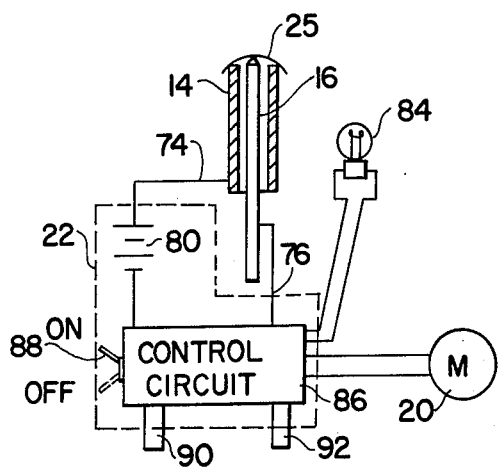
FIG. 3 is a schematic representation of the electrical circuitry used in the lens measuring apparatus of the present invention.

In order to take advantage of the electrical conducting properties of such lenses, the support collar 14 is metallic and has an electrical cable 72 connected thereto by means of a screw 74. This cable 72 is connected at its other end to electrical circuitry 22 in the base 75 of the lens measuring apparatus 10. Likewise, the calibration rod or post 16, and in particular the tip which is adapted to contact the lens, is also metallic, as is the drive frame 50 to which the rod 16 is attached. A second electrical cable 76 is connected to the drive frame 50 at one end by means of a second screw 78 and at the other end is connected to the electrical circuitry 22. As seen in FIG. 3, in the electrical circuitry 22, the cable 72 is connected to the positive side of a potential means 80, such as for example the rectified output of a power supply, and the cable 72 is connected to a control circuit 86, which in turn is connected to the negative side of the potential means 80. The nylon bearing 28 through which the calibration rod 16 passes serves to insulate the calibration rod 16 from the support collar 14, and thus prevent completion of the electrical circuit.

When a lens 25 capable of conducting electricity is supported on the support collar 14 and the calibration rod 16 is moved into contact therewith, the electrical circuit is completed and the voltage of the potential means 80 is connected across the control circuit 86 through the electrically conducting lens 25. This voltage (or the associated current in the loop comprised of the potential means 80, support collar 14, the lens 25, the calibration rod 16, and the control circuit 86) can then be used by the control circuit 86 for a variety of purposes.

In the preferred embodiment, the main function of the control circuit and associated equipment is to stop movement of the calibration rod 16 when the voltage is applied across the control circuit 86—namely, when the calibration rod 16 first comes into contact with the surface of the lens 25.

This function is accomplished by amplifying the current being conducted through the control current 86. The amplified current is then used to switch off or disconnect the source of power to the D.C. motor 20 in a conventional manner which in turn stops the motor 20, and thus movement of the rod 16. In addition, the current amplified in the control circuit 86 is used to light the lamp 84 mounted on the base 75 of the lens measuring apparatus 10. The control circuit 86 further includes an on-off switch 88 for completely shutting off the lens measuring apparatus 10 when not in use.

The current is amplified in the control circuit 86 for the reason that hydrophilic lenses, while they are conductors of electricity, are not excellent conductors. For example, with hydrophilic contact lenses hydrated by a normal saline solution, and with a six-volt potential means 80, the magnitude of the current conducted through the circuit loop comprised of the potential means 80, the support collar 14, the lens 25, the calibration rod 16, and the control circuit 86 has been found to be on the order of 0.4 microamps. As can be appreciated, this is a relatively small current. In the preferred embodiment, the degree of amplification is 103 db (decibles).

Detection of such a small current by the control circuit 86 is possible with use of COS/MOS integrated circuits in the control circuit 86 which present an equal or higher impedance than does the lens 25. Also, although not necessary, the cables 72, 76 may, as a precaution against noise, comprise shielded cables.

Figure 4:
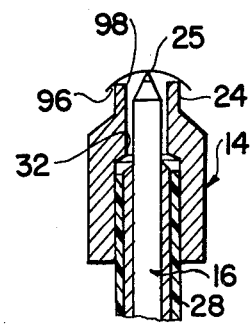
FIG. 4 is an enlarged sectional view illustrating measurement of the radius of curvature of a concave surface of the lens.
Figure 5:
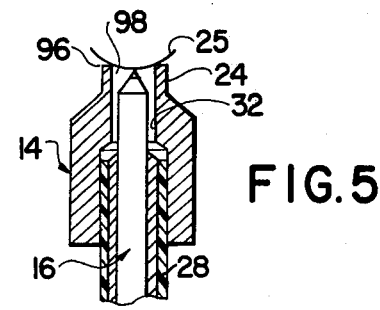
FIG. 5 is an enlarged sectional view illustrating measurement of the radius of curvature of a convex surface of the lens.

In operation, a soft or hydrophilic contact lens 25 is supported either concavely (as shown in FIG. 4) or convexly (as shown in FIG. 5) on the upper surface of the support column 24 with the calibration post or rod 16 in a lowered position. The automatic "up" button 90 of the control circuit 86 is then pushed which actuates the D.C. motor 20 to slowly drive the calibration post or rod 16 upwardly. When the tip of the calibration post 16 contacts the surface of the lens 25, the circuit is completed and the voltage of the potential means 80 is connected across the control circuit 86 through the lens 25. The current conducted through the control circuit 86 is amplified and is then used to stop the motor 20, and thus to stop movement of the rod 16. The radius of curvature (or other desired measurement) of the lens 25 can be read directly from the dial gauge 18 with the aid of scale 42 and indicator needle 44. A manual "down" button 92 is also provided on the housing 12 which serves to reverse the potential to the D.C. motor 20 and drive the calibration rod 16 downward. The disconnection or switching off of power to the motor 20 as a result of the circuit being completed through the lens 25 does not affect this switching of the potential to the motor 20 to drive the calibration rod downwardly.

While in the preferred embodiment of the present invention, the current conducted through the control circuit 86 by virtue of the circuit being completed through the lens 25 is used to stop the motor 20 driving the calibration rod 16 upwardly, it is to be noted that this is not necessary for practice of the present invention. Alternatively, the "up" and "down" buttons 90, 92 could be used in conjunction with the indicator lamp 84 to obtain, to a very fine degree, precise positioning of the calibration rod 16 relative to the support collar 14. The lamp 84 will only light when both the calibration rod 16 and the support collar 14 are in contact with the surface of the lens 25. Thus, by alternatively moving the rod 16 up and down, the precise position in which the rod 16 first contacts the lens 25 can be determined.

As noted above, it is possible with the lens measuring apparatus 10 of the present invention to measure the radius of curvature of both the convex and the concave sides of the lens 25, although the radius of curvature of the concave side is of more primary interest. In measuring the radius of curvature of the concave side, it is the outer edge 96 of the support column 24 which supports the lens 25, as shown in FIG. 4. Accordingly, it is the outside diameter of the cylindrical surface of the support column 24 which is used to determine the radius of curvature. On the other hand, if the radius of curvature of the convex side of the lens 25 is to be measured, the lens 25 is supported by the inside cylindrical edges 98 of the support column 24, as shown in FIG. 5. When making this measurement, it is the diameter of bore 32 of the support column 24 which is used in determining the radius of curvature measurement. Accordingly, as can be appreciated, different dial scales 42 have to be used to give a proper reading, depending on whether the radius of curvature of the concave or the convex side of the lens 25 is to be measured. Alternatively, a dial scale 42 could be provided with two sets of markings and numbers corresponding respectively to the radius of curvature of the concave or convex sides of the lens 25. Further still, a completely new dial gauge or other device can be used for the different types of measurements. For this latter purpose, the dial gauge 18 may be removably supported in the housing 12 by means of an adjustment screw 100 which bears against a support shaft 102 of the dial gauge 18, as shown in FIG. 2.

To properly set dial gauge 18 once the proper scale 42 is chosen for a particular type of measurement, e.g. radius of curvature of the concave surface of lenses, a lens of known radius of curvature is used. This known lens, which may for example comprise a flat electrically conducting lens, but which more preferably has a known radius of curvature in the range of the expected radius of curvature of the lenses to be measured, is placed on the support column 24 and the calibration rod 16 moved upwardly into contact therewith, thereby causing the motor 20 to stop. This position of the calibration rod 16 relative to the support column 24 should produce the known radius of curvature reading on the dial gauge 18. To achieve this, a stop or set screw 104 mounted on the circumference of the dial gauge housing 48 is loosened and the dial scale 42 rotated into position so that the known value lines up with the indicator needle 44. This rotational position of the scale 42 is then fixed by tightening of the set screw 104. The lens measuring apparatus 10 may then be used in the manner as described above to measure the radius of curvature (or other surface measurement) of a series of lenses which are electrically conducting or which are adapted to conduct electricity.

Accordingly, it is seen that the present invention provides a convenient method and apparatus for obtaining desired measurements of electrically conductive lenses. While the method and apparatus of the present invention are particular useful for determining the radius of curvature of such lenses, the present invention may also be used to obtain other measurements, such as for example, those described in U.S. Pat. No. 3,479,744. Furthermore, it should be understood that the various components of the lens measuring device 10 of the present invention can be replaced with other components serving a similar function. For example, the dial gauge 18 could measure the radius of curvature in terms of diopters or focal length. Additionally, the dial gauge 18 could be replaced with a digital system or other type of meter. Further still, the voltage and the degree of current ampification can be different from the values indicated depending on the various components which are used. In addition, further changes within the scope of the present invention would be within the skill of an ordinary person skilled in the art.

While the preferred embodiment of the present invention has been shown and described, it will be understood that such is merely illustrative and that changes may be made without departing from the scope of the invention as claimed.

What is claimed is:

1. A lens measuring apparatus for obtaining a desired measurement of an electrically conductive lens having first and second opposed surfaces, said lens measuring apparatus comprising:
    a first electrical conducting contact for contacting a first portion of the first surface of said lens, said first electrical contact comprising a support collar having a metallic support contact surface for supporting said lens thereon with said first surface of said lens in electrical contact with said support contact surface;
    a second electrical conducting contact mounted for movement with respect to said first electrical conducting contact for selectively contacting a second portion of said first surface of said lens, the relative positioning of said first and second electrical conducting contacts being indicative of the desired measurement of the lens, said second electrical conducting contact comprising a rod mounted for movement along a line substantially normal to said support contact surface and having a metallic tip for contacting said first surface of said lens whereby the position of said tip relative to said support contact surface of said support collar is indicative of said desired measurement;
    potential means for applying a potential across said first and second contacts to cause current to be conducted between said first and second contacts through said lens when both of said first and second electrical conducting contacts contact said first surface of said lens;
    moving means for moving said second electrical conducting contact relative to said first electrical conducting contact to change the relative positioning of said first and second contacts; and
    sensing means for sensing said current conducted between said first and second contacts through said lens.

2. The lens measuring apparatus of claim 1 further including indication means responsive to said sensing means for indicating that both of said first and second electrical conducting contacts are in contact with said first surface of said lens.

3. The lens measuring apparatus of claim 2 wherein said indication means comprises a light.

4. The lens measuring apparatus of claim 1 further including stop means responsive to said sensing means for causing said moving means to stop moving said second electrical conducting contact.

5. The lens measuring apparatus of claim 4 wherein said moving means comprises an electric motor for moving said second electrical conducting contact relative to said first electrical conducting contact; and wherein said stop means comprises switch means for switching off said motor.

6. The lens measuring apparatus of claim 1 further including gauge means operatively connected to said rod for indicating the position of said tip of said rod relative to said end support surface of said support collar.

7. The lens measuring apparatus of claim 1 wherein said rod has a rack thereon and said gauge means includes gearing engagable with said rack for converting vertical movement of said rod into changes in the desired measurement of said lens.

8. The lens measuring apparatus of claim 1 wherein said support collar includes two end support surfaces for said lens, one of said support surfaces being adapted to contact and support the concave surface of said lens and the other of said support surfaces being adapted to contact and support the convex surface of said lens.

9. The lens measuring apparatus of claim 8 wherein said support collar includes two end support surfaces for said lens, one of said end support surfaces being adapted to contact and support said first surface of said lens when said first surface is a concave surface and the other of said end support surfaces being adapted to contact and support said first surface of said lens when said first surface is a convex surface.

10. The lens measuring apparatus of claim 1 wherein said support collar comprises a metallic hollow cylindrical support collar having its axis substantially vertically aligned; wherein said support contact surface comprises an end surface of said cylindrical support collar and wherein said rod is positioned within said cylindrical support collar and mounted for vertical movement relative thereto, the axis of said rod being aligned with the axis of said cylindrical support collar.

11. A lens measuring method for obtaining a desired measurement of an electrically conductive lens comprising the steps of:

providing first and second electrical conducting contacts for selectively engaging the surface of said lens, the relative position of said first and second electrical conducting contacts being indicative of the desired measurement;

applying a potential across said first and second electrical conducting contacts to cause current to be conducted between said first and second contacts through said lens when both said first and second electrical conducting contacts contact the surface of said lens;

engaging the surface of said lens with said first electrical conducting contact;

moving said second electrical conducting contact into engagement with the surface of said lens;

sensing the current conducted between said first and second contacts through said lens when said second electrical conducting contact is moved into said engagement with the surface of said lens; and stopping movement of said second contact relative to said first contact in response to said current conducted through said lens being sensed.

12. The lens measuring method of claim 11 wherein the step of engaging the surface of said lens with said first electrical conducting contact comprises supporting said lens on said first electrical conducting contact prior to the step of moving said second electrical conducting contact into engagement with the surface of said lens.

13. The lens measuring method of claim 11 further including the step of determining the relative position of said first and second contacts after the movement of said second contact is stopped.

14. The lens measuring method of claim 11 further including the step of indicating when current is conducted between said first and second contacts through said lens.

15. The lens measuring method of claim 14 wherein said step of indicating comprises lighting a lamp.

* * * * *